US010031462B2

(12) United States Patent
Takifuji et al.

(10) Patent No.: US 10,031,462 B2
(45) Date of Patent: Jul. 24, 2018

(54) IMAGE FORMING APPARATUS

(71) Applicant: Brother Kogyo Kabushiki Kaisha, Nagoya-shi, Aichi-ken (JP)

(72) Inventors: Kotaro Takifuji, Nagoya (JP); Hiroshi Nakano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 25 days.

(21) Appl. No.: 14/926,081

(22) Filed: Oct. 29, 2015

(65) Prior Publication Data

US 2016/0123434 A1    May 5, 2016

(30) Foreign Application Priority Data

Oct. 31, 2014   (JP) .................................. 2014-222150

(51) Int. Cl.
| | |
|---|---|
| *B41J 2/165* | (2006.01) |
| *G03G 15/00* | (2006.01) |
| *F16G 1/22* | (2006.01) |
| *G03G 15/16* | (2006.01) |

(52) U.S. Cl.
CPC ........... *G03G 15/6529* (2013.01); *F16G 1/22* (2013.01); *G03G 15/1665* (2013.01); *G03G 2215/00151* (2013.01)

(58) Field of Classification Search
None
See application file for complete search history.

(56) References Cited

U.S. PATENT DOCUMENTS

| 5,017,969 A | 5/1991 | Mitomi et al. |
|---|---|---|
| 6,141,522 A | 10/2000 | Tsuruoka et al. |
| 7,302,217 B2 | 11/2007 | Takiguchi et al. |
| (Continued) | | |

FOREIGN PATENT DOCUMENTS

| JP | H01-300280 A | 12/1989 |
|---|---|---|
| JP | H03-297714 A | 12/1991 |
| (Continued) | | |

OTHER PUBLICATIONS

May 15, 2018—(JP) Notification of Reasons for Rejection—App 2014-222150, Eng Tran.

*Primary Examiner* — Alejandro Valencia
(74) *Attorney, Agent, or Firm* — Banner & Witcoff, Ltd.

(57) ABSTRACT

An image forming apparatus including a belt wound around a plurality of rollers, and a restriction portion disposed outside a specific roller of the plurality of rollers in a rotational axis direction of the specific roller, the restriction portion being configured to restrict movement of the belt in the rotational axis direction by contacting an end surface of the belt in the rotational axis direction, the belt having a first outer circumferential surface of an end portion of the belt in the rotational axis direction, the end portion including the end surface contactable with the restriction portion, and a second outer circumferential surface of a middle portion of the belt in the rotational axis direction, the first outer circumferential surface being positioned outside the second outer circumferential surface in a radial direction of the specific roller, the first outer circumferential surface being parallel to the second outer circumferential surface.

19 Claims, 5 Drawing Sheets

(56) References Cited

U.S. PATENT DOCUMENTS

| | | | |
|---|---|---|---|
| 7,623,816 B2* | 11/2009 | Maki | B65G 15/64 |
| | | | 399/163 |
| 8,099,032 B2 | 1/2012 | Iwami et al. | |
| 8,112,015 B2 | 2/2012 | Kichise et al. | |
| 9,114,643 B2 | 8/2015 | Yasumoto | |
| 2003/0091373 A1* | 5/2003 | Abe | B65G 23/44 |
| | | | 399/302 |
| 2004/0076455 A1* | 4/2004 | Fujiwara | G03G 15/161 |
| | | | 399/303 |
| 2005/0095041 A1* | 5/2005 | Kim | G03G 15/1685 |
| | | | 399/302 |
| 2006/0056885 A1 | 3/2006 | Takiguchi et al. | |
| 2008/0003024 A1* | 1/2008 | Sawai | G03G 15/0131 |
| | | | 399/308 |
| 2009/0003894 A1* | 1/2009 | Kim | G03G 15/1615 |
| | | | 399/302 |
| 2009/0011882 A1 | 1/2009 | Kichise et al. | |
| 2010/0239334 A1 | 9/2010 | Iwami et al. | |
| 2013/0064581 A1 | 3/2013 | Okamoto et al. | |
| 2014/0183008 A1 | 7/2014 | Yasumoto | |

FOREIGN PATENT DOCUMENTS

| | | |
|---|---|---|
| JP | H04-78363 A | 3/1992 |
| JP | H05-134556 A | 5/1993 |
| JP | H05-221550 A | 8/1993 |
| JP | H05-306037 A | 11/1993 |
| JP | H06-51578 A | 2/1994 |
| JP | H08-063000 A | 3/1996 |
| JP | H10-186888 A | 7/1998 |
| JP | H10-265077 A | 10/1998 |
| JP | H11-161037 A | 6/1999 |
| JP | 2001-147599 A | 5/2001 |
| JP | 2001-255778 A | 9/2001 |
| JP | 2002-173247 A | 6/2002 |
| JP | 2002-181144 A | 6/2002 |
| JP | 2002-182482 A | 6/2002 |
| JP | 2002-182483 A | 6/2002 |
| JP | 2002-278365 A | 9/2002 |
| JP | 2002-351229 A | 12/2002 |
| JP | 2003-149951 A | 5/2003 |
| JP | 2006-084568 A | 3/2006 |
| JP | 2007-334020 A | 12/2007 |
| JP | 2008-170478 A | 7/2008 |
| JP | 2009-012898 A | 1/2009 |
| JP | 2009-223285 A | 10/2009 |
| JP | 2012-042650 A | 3/2012 |
| JP | 2013-061532 A | 4/2013 |
| JP | 2013-083693 A | 5/2013 |
| JP | 2014-130181 A | 7/2014 |
| JP | 2014-153512 A | 8/2014 |
| JP | 2014-178605 A | 9/2014 |

* cited by examiner

IMAGE FORMING APPARATUS

CROSS-REFERENCE TO RELATED APPLICATION

This application claims priority under 35 U.S.C. § 119 from Japanese Patent Application No. 2014-222150 filed on Oct. 31, 2014. The entire subject matter of the application is incorporated herein by reference.

BACKGROUND

Technical Field

The following description relates to one or more aspects of an image forming apparatus having a belt wound around a plurality of rollers.

Related Art

An image forming apparatus has been known that includes a belt wound around a plurality of rollers, and restriction portions disposed outside the rollers in a rotational axis direction of the rollers. The restriction portions are configured to contact end surfaces of the belt in the rotational axis direction and restrict movement of the belt in the rotational axis direction.

The known image forming apparatus further includes a mechanism configured to move the belt along the rotational axis direction by appropriately changing an inclination of at least one of the rollers relative to the rotational axis direction so as to equalize respective periods of time during which the both end surfaces of the belt in the rotational axis direction are in contact with the corresponding restriction portions, respectively. Thereby, since the end surfaces of the belt in the rotational axis direction contact the corresponding restriction portions, it is possible to prevent the end surfaces of the belt from being damaged.

SUMMARY

As the known image forming apparatus includes the above mechanism, the image forming apparatus needs to have a complicated structure. Therefore, it is desired to achieve an image forming apparatus having a simple configuration to prevent the end surfaces of the belt from being damaged.

Aspects of the present disclosure are advantageous to provide one or more improved techniques to achieve an image forming apparatus having a simple configuration to prevent end surfaces of a belt of the apparatus from being damaged.

According to aspects of the present disclosure, an image forming apparatus is provided, which includes a belt wound around a plurality of rollers, and a restriction portion disposed outside a specific roller of the plurality of rollers in a rotational axis direction of the specific roller, the restriction portion being configured to restrict movement of the belt in the rotational axis direction by contacting an end surface of the belt in the rotational axis direction, the belt having a first outer circumferential surface of an end portion of the belt in the rotational axis direction, the end portion including the end surface contactable with the restriction portion, and a second outer circumferential surface of a middle portion of the belt in the rotational axis direction, the first outer circumferential surface being positioned outside the second outer circumferential surface in a radial direction of the specific roller, the first outer circumferential surface being parallel to the second outer circumferential surface.

DETAILED DESCRIPTION

It is noted that various connections are set forth between elements in the following description. It is noted that these connections in general and, unless specified otherwise, may be direct or indirect and that this specification is not intended to be limiting in this respect.

First Illustrative Embodiment

Hereinafter, a first illustrative embodiment according to aspects of the present disclosure will be described with reference to relevant drawings. In the following description, firstly, an outline configuration of an image forming apparatus in the first illustrative embodiment will be explained. Subsequently, a detailed configuration around a belt will be described. Further, in the following description, each direction of the image forming apparatus will be defined on the basis of a user of the apparatus. Specifically, a left side in FIG. 1 that is a near side in a user's view will be defined as a front side of the apparatus. A right side in FIG. 1 that is a far side in the user's view will be defined as a rear side of the apparatus. A near side and a far side with respect to a plane surface of FIG. 1 will be defined as a right side and a left side of the apparatus, respectively. An upper side and a lower side in FIG. 1 will be defined as an upper side and a lower side of the apparatus, respectively.

Figure 1:
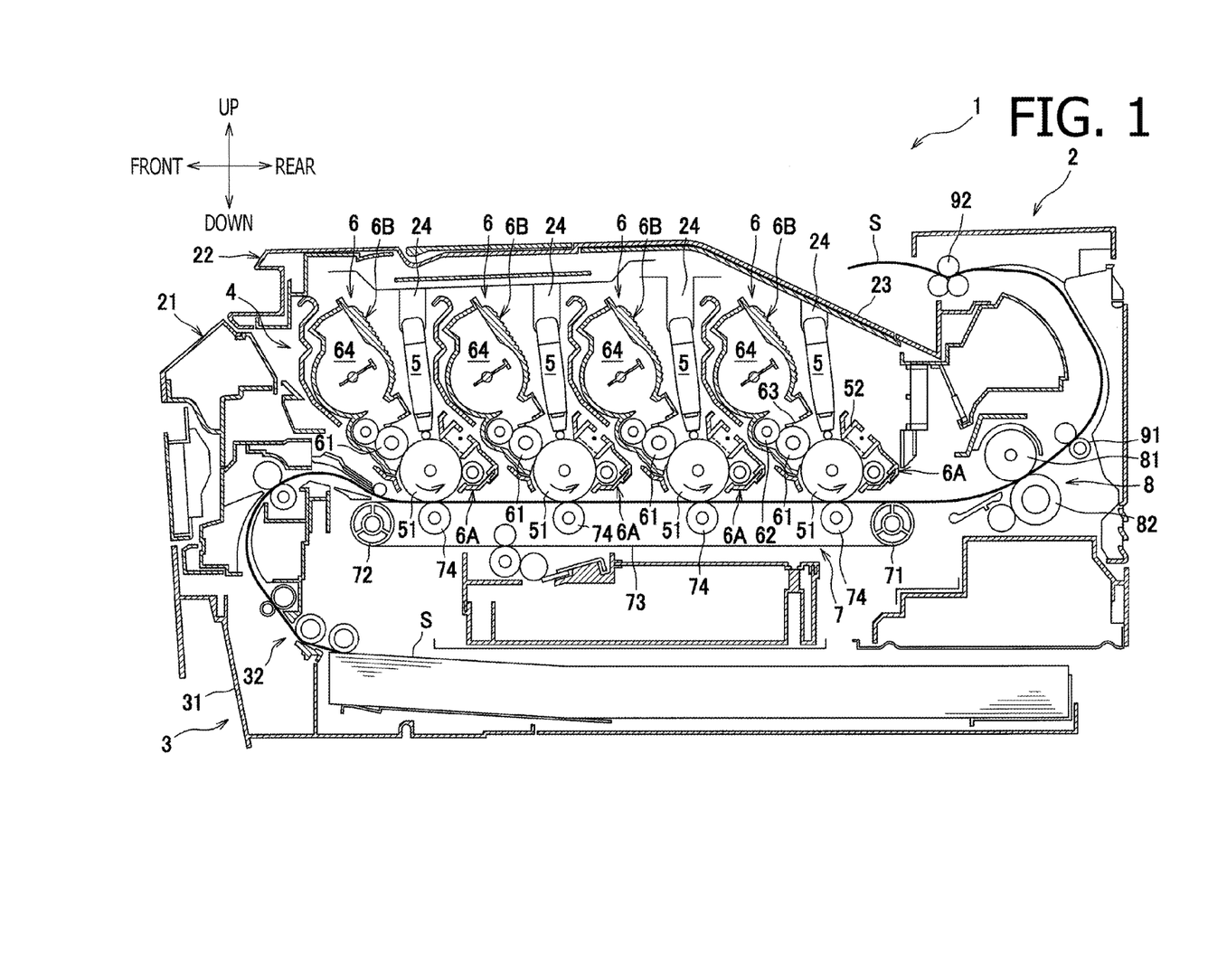
FIG. 1 is a cross-sectional side view schematically showing a configuration of a color printer in a first illustrative embodiment according to one or more aspects of the present disclosure.

As shown in FIG. 1, a color printer 1, which is an example of the image forming apparatus, includes a sheet feeding unit 3 and an image forming unit 4 inside a main body housing 2. The main body housing 2 includes a box-shaped main body frame 21 and an upper cover 22. The main body frame 21 has an opening formed at an upper portion of the main body frame 21. The upper cover 22 is disposed above the main body frame 21. The upper cover 22 is configured to open and close the opening of the main body frame 21 by rotating up and down around a rotational shaft (not shown) disposed at a rear portion of the color printer 1.

The sheet feeding unit 3 is disposed at a lower portion of the main body housing 2. The sheet feeding unit 3 includes a feed tray 31 and a sheet feeding mechanism 32. The feed tray 31 is configured to accommodate sheets S set therein. The sheet feeding mechanism 4 is configured to feed the sheets S set in the feed tray 31 to the image forming unit 4. By the sheet feeding mechanism 4, the sheets S set in the feed tray 31 are separated on a sheet-by-sheet basis and fed onto a below-mentioned conveyance belt 73 of the image forming unit 4.

The image forming unit 4 includes four exposure units 5, four process cartridges 6, a transfer unit 7, and a fuser unit 8.

Each exposure unit 5 is disposed to face an upper portion of a corresponding one of photoconductive drums 51. Each exposure unit 5 includes a plurality of light emitting diodes (hereinafter referred to as "LEDs") arranged along a left-to-right direction at a lower end portion of each exposure unit 5. Each exposure unit 5 is configured to expose a surface of the corresponding photoconductive drum 51 by turning on and off the LEDs based on image data. Further, each exposure unit 5 is held by the upper cover 22 via a corresponding one of holders 24. When the upper cover 22 is opened, the exposure units 5 move together with the upper cover 22 to be separated away from the photoconductive drums 51.

The process cartridges 6 are arranged along a front-to-rear direction, between the upper cover 22 and the feed tray 31 in a vertical direction. When the upper cover 22 is open, the process cartridges 6 are allowed to be attached to and detached from the main body frame 21. Each process cartridge 6 includes a drum unit 6A and a development unit 6B.

Each drum unit 6A includes a photoconductive drum 51 and a charger 52. Each development unit 6B is detachably attached to the corresponding drum unit 6A. Each development unit 6B includes a development roller 61, a supply roller 62, a layer thickness regulating blade 63, and a container 64 configured to accommodate toner. The toner in the container 64 is supplied to the development roller 61 by the supply roller 62. Then, the toner is carried on the development roller 61 after being regulated to have a constant thickness between the development roller 61 and the layer thickness regulating blade 63.

The transfer unit 7 is disposed between the feed tray 31 and the process cartridges 6 in the vertical direction. The transfer unit 7 includes a driving roller 71, a driven roller 72, a conveyance belt 73, and a plurality of transfer rollers 74. The conveyance belt 73 is wound around the driving roller 71 and the driven roller 72. Each photoconductive drum 51 is disposed to face an upward-facing outer circumferential surface of the conveyance belt 73. In the first illustrative embodiment, the plurality of transfer rollers 74 are four transfer rollers corresponding to the four photoconductive drums 51, respectively. Each transfer roller 74 is disposed to face the corresponding photoconductive drum 51 across the conveyance belt 73.

The fuser unit 8 is disposed behind (i.e., on a rear side of) the process cartridges 6 and the transfer unit 7. The fuser unit 8 includes a heating roller 81 and a pressing roller 82.

The image forming unit 4 is configured to form electrostatic latent images on the photoconductive drums 51 by charging the surfaces of the photoconductive drums 51 by the chargers 52 and exposing the surfaces of the photoconductive drums 51 by the exposure units 5. Then, as the toner carried on the development rollers 61 is supplied to the surfaces of the photoconductive drums 51, the electrostatic latent images are developed into visible toner images on the photoconductive drums 51.

Thereafter, when a sheet S fed onto the conveyance belt 73 from the sheet feeding unit 3 is conveyed between the photoconductive drums 51 and the transfer rollers 74 supplied with a transfer bias, the toner images carried on the photoconductive drums 51 are transferred onto the sheet S by the transfer rollers 74. Then, when the sheet S with the toner images transferred thereon is conveyed between the heating roller 81 and the pressing roller 82, the toner images are thermally fixed onto the sheet S.

The sheet S with the toner images fixed thereon is discharged onto a discharge tray 23 by a conveyance roller 91 and a discharge roller 92. The discharge tray 23 is provided on an upper surface of the upper cover 22.

Figure 2:
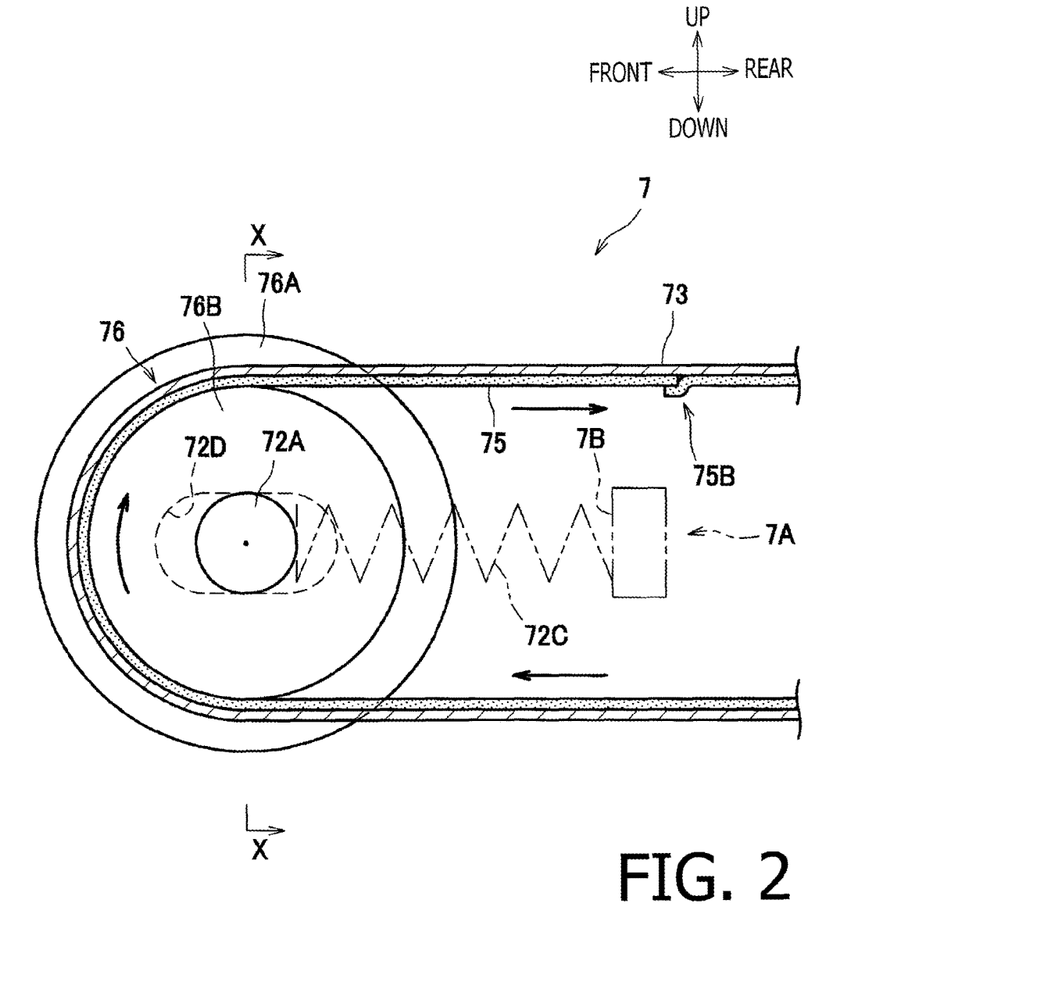
FIG. 2 is a cross-sectional side view from the right, schematically showing a left end portion of a conveyance belt of a transfer unit of the color printer in the first illustrative embodiment according to one or more aspects of the present disclosure.
Figure 3:
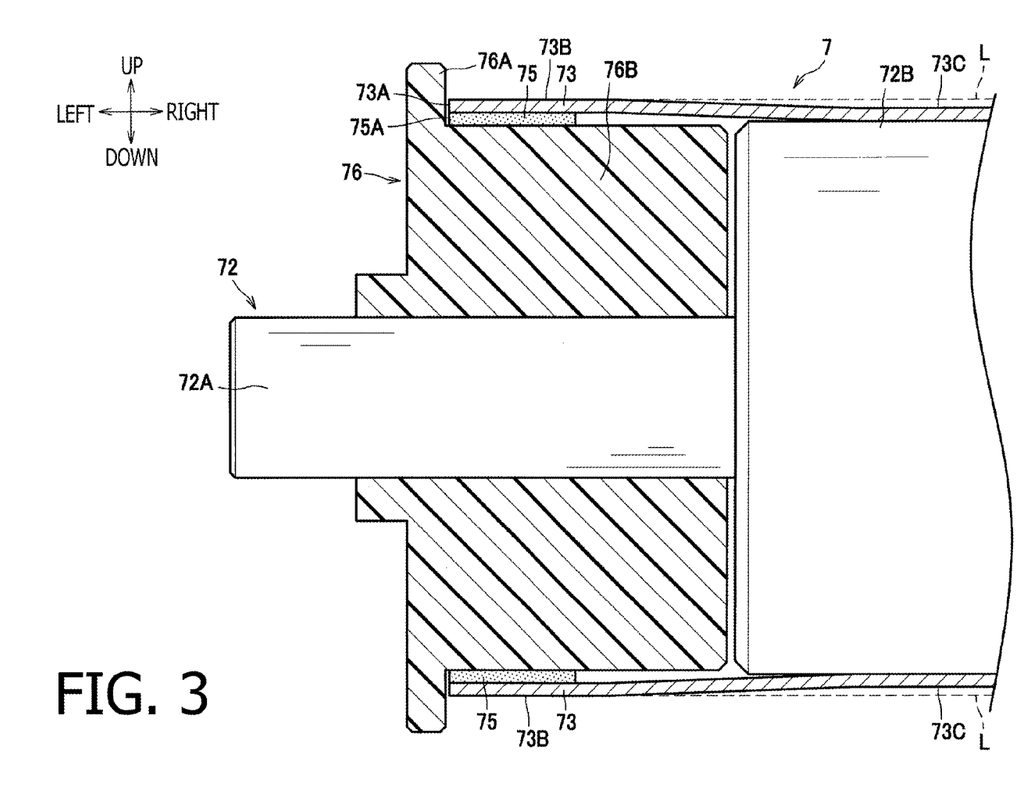
FIG. 3 is a cross-sectional front view along line X-X shown in FIG. 2, schematically showing a left end portion of the transfer unit in the first illustrative embodiment according to one or more aspects of the present disclosure.

Subsequently, a configuration of a part of the transfer unit 7 around the driven roller 72 will be described. As shown in FIGS. 2 and 3, the transfer unit 7 further includes reinforcing bands 75 and restriction members 76 in addition to the driving roller 71, the driven roller 72, and the conveyance belt 73. The transfer unit 7 is configured in a bilaterally symmetric manner in the left-to-right direction. Namely, a left portion and a right portion of the transfer unit 7 have substantially the same configuration. Therefore, FIGS. 2 and 3 show the left portion of the transfer unit 7, but do not show the right portion thereof. Further, an explanation of the right portion of the transfer unit 7 will be omitted.

As shown in FIG. 3, the driven roller 72 includes a shaft 72A and a roller main body 72B. The driven roller 72 is rotated in accordance with rotation of the conveyance belt 73. The conveyance belt 73 is rotated by a driving force from the driving roller 71. A rotational axis direction of the driven roller 72 is parallel to the left-to-right direction.

Further, as shown in FIG. 2, the shaft 72A of the driven roller 72 is urged forward (i.e., in such a direction as to become farther away from the driving roller 71) by an urging member 72C such as a coil spring. The urging member 72C is a compression coil spring. An end portion of the urging member 72C in an urging direction is in contact with a supporter 7B. The supporter 7B is disposed at each of left and right side walls 7A of the transfer unit 7. The other end portion of the urging member 72C in the urging direction is in contact with the shaft 72A. Thereby, when the conveyance belt 73 is wound around the driving roller 71 and the driven roller 72, a tensile force is applied to the conveyance belt 73.

A left end portion and a right end portion of the shaft 72A are supported by bearings 72D formed at the left side wall 7A and the right side wall 7A of the transfer unit 7, respectively. Each bearing 72D is a long hole elongated in parallel with the urging direction of the urging member 72C. The bearings 72D allow the shaft 72A to move along the urging direction of the urging member 72C. Further, the bearings 72D restrict the shaft 72A from moving in a direction perpendicular to the urging direction of the urging member 72C. Thereby, in the first illustrative embodiment, there is no moving mechanism provided to move the conveyance belt 73 along the rotational axis direction of the driven roller 72 by changing an inclination of the driven roller 72 with respect to the rotational axis direction. Further, in the first illustrative embodiment, there is no restriction mechanism provided to restrict movement of the conveyance belt 73 by changing the tensile force applied to the conveyance belt 73.

As shown in FIG. 3, the roller main body 72B is formed in a cylindrical shape having a diameter larger than a diameter of the shaft 72A. Further, the roller main body 72B is made of metal such as aluminum. The roller main body 72B is rotatable integrally with the shaft 72A. An outer circumferential surface of the roller main body 72B is in contact with an inner circumferential surface of the conveyance belt 73.

As shown in FIG. 2, the conveyance belt 73 is an endless belt that is seamless in its circumferential direction. For instance, the conveyance belt 73 may be formed by cutting out a predetermined width of belt from a tube-shaped belt base material. Further, for instance, the conveyance belt 73 may be made of resin material such as nylon.

Figure 4:
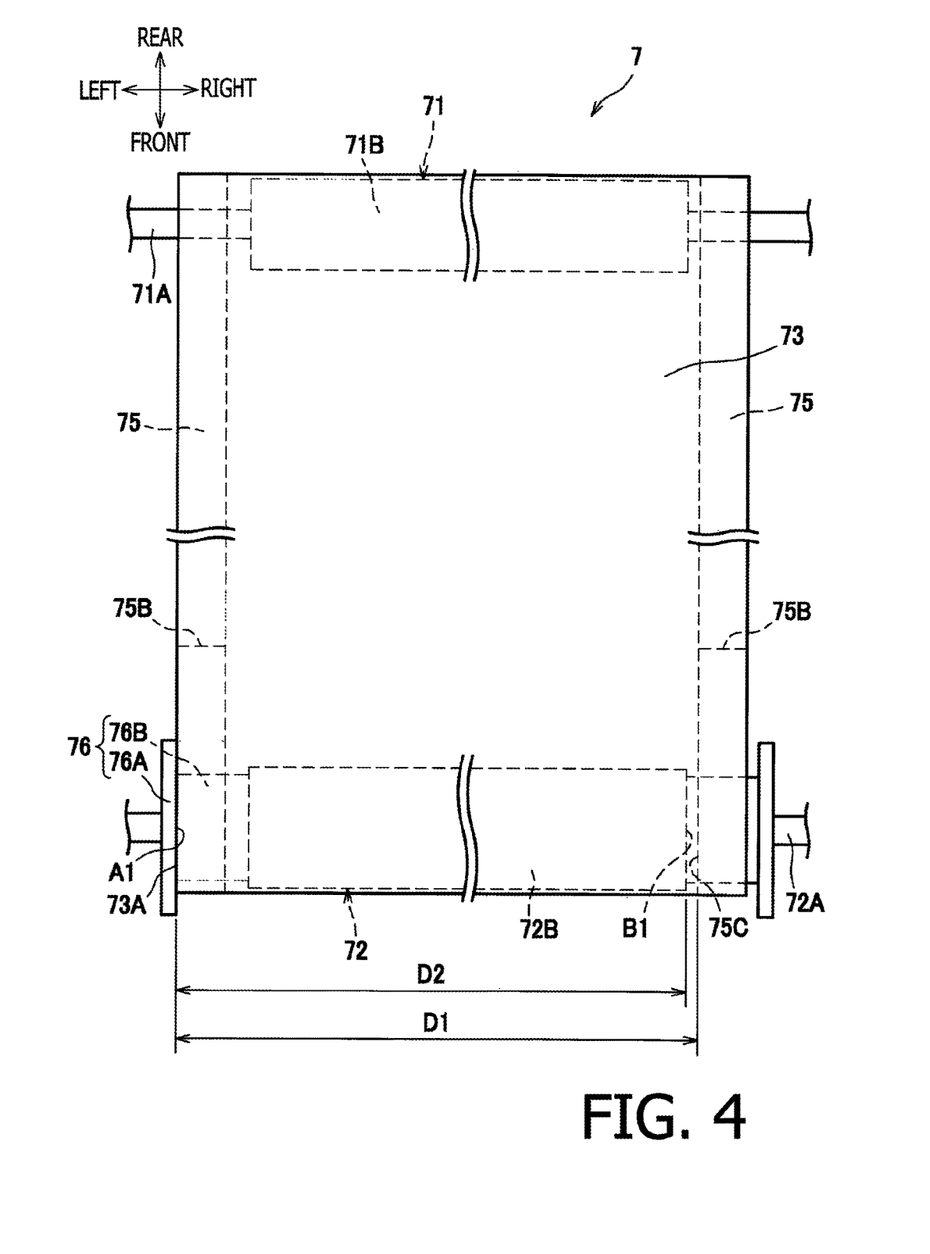
FIG. 4 is a plane view of the transfer unit in the first illustrative embodiment according to one or more aspects of the present disclosure.

The reinforcing bands 75 are two belt-shaped tapes that are attached to a left end portion and a right end portion of the inner circumferential surface of the conveyance belt 73, respectively (see FIGS. 2 to 4). Each reinforcing band 75 may be made of material (e.g., polyethylene-terephthalate) having a Young's modulus larger than a Young's modulus of the conveyance belt 73.

As shown in FIG. 3, outer end surfaces 75A (see a left side in FIG. 3) of the reinforcing bands 75 in the left-to-right direction are flush with end surfaces 73A of the conveyance belt 73 in the left-to-right direction, respectively. In other words, the outer end surfaces 75A of the reinforcing bands 75 in the left-to-right direction are positionally coincident in the left-to-right direction with the left and right end surfaces 73A of the conveyance belt 73.

As shown in FIG. 2, each reinforcing band 75 is attached throughout an entire circumference of the inner circumferential surface of the conveyance belt 73. Each reinforcing band 75 has a joint 75B where one end and the other end of the reinforcing band 73 in the circumferential direction overlap each other. The joint 75B of the left reinforcing band 75 is positionally coincident in the circumferential direction with the joint 75B of the right reinforcing band 75. Nonetheless, the joint 75B of the left reinforcing band 75 may be positioned differently from the joint 75B of the right reinforcing band 75 in the circumferential direction.

In the first illustrative embodiment, a length of the conveyance belt 73 in the left-to-right direction is smaller than a length of the photoconductive drums 51 in the left-to-right direction, and is larger than a length of the transfer rollers 74 in the left-to-right direction. The transfer rollers 74 are disposed between the reinforcing bands 75 in the left-to-right direction.

The restriction members 76 include a left restriction member 76 disposed on a left side of the roller main body 72B, and a right restriction member 76 disposed on a right side of the roller main body 72B (see FIGS. 2 to 4). Each restriction member 76 includes a restriction portion 76A and an edge portion 76B.

As shown in FIG. 3, each restriction portion 76A is positioned outside the roller main body 72B in the left-to-right direction. The restriction portions 76A are configured to contact the end surfaces 73A of the conveyance belt 73 in the left-to-right direction, respectively. Each restriction portion 76A protrudes radially from an outer circumferential surface of the corresponding edge portion 76B, throughout an entire circumference of the outer circumferential surface of the corresponding edge portion 76B. The restriction portions 76A are configured to restrict movement of the conveyance belt 73 in the left-to-right direction by contacting the end surfaces 73A of the conveyance belt 73 in the left-to-right direction, respectively.

Each edge portion 76B is positioned between the roller main body 72B and the corresponding restriction portion 76A. Each edge portion 76B is formed integrally with the corresponding restriction portion 76A. Each edge portion 76B is formed in such a cylindrical shape that the shaft 72A is inserted therethrough. Namely, the edge portions 76B are rotatable independently of the roller main body 72B. Further, the edge portions 76B have a rotational axis that is the same as a rotational axis of the roller main body 72B. Namely, the rotational axis is common to the edge portions 76B and the roller main body 72B.

The outer circumferential surface of each edge portion 76B is in contact with the corresponding reinforcing band 75. Each edge portion 76B has a diameter smaller than the diameter of the roller main body 72B. More specifically, a radial length resulting from adding a thickness of the reinforcing band 75 to a radius of the edge portion 76B is larger than a radius of the roller main body 72B. Therefore, a first outer circumferential surface 73B of the conveyance belt 73 is positioned radially outside a second outer circumferential surface 73C of the conveyance belt 73. The first outer circumferential surface 73B is positioned at each end portion of the conveyance belt 73 in the left-to-right direction. The second outer circumferential surface 73C is positioned at a middle portion of the conveyance belt 73 in the left-to-right direction. Therefore, the conveyance belt 73 is deformed in such a manner that each end portion of the conveyance belt 73 in the left-to-right direction is pulled radially outward of the middle portion of the conveyance belt 73 in the left-to-right direction.

It is noted that each first outer circumferential surface 73B is an outer circumferential surface of a portion of the conveyance belt 73 to which the corresponding reinforcing band 75 is attached, the portion hanging on the corresponding edge portion 76B and including the corresponding end surface 73A. The second outer circumferential surface 73C is an outer circumferential surface of a portion of the conveyance belt 73 that is positioned between the first outer circumferential surfaces 73B in the left-to-right direction, the portion hanging on the roller main body 72B and always contacting the outer circumferential surface of the roller main body 72B.

Each edge portion 76B is configured such that the outer circumferential surface thereof is parallel to the rotational axis direction in a cross section containing the rotational axis. In addition, the roller main body 72B is configured such that the outer circumferential surface thereof is parallel to the rotational axis direction in a cross section containing the rotational axis. It is noted that as described above, the rotational axis is common to the edge portions 76B and the roller main body 72B. In other words, each edge portion 76B has a cylindrical shape formed around the rotational axis. Further, every straight line contained in the outer circumferential surface of each edge portion 76B is parallel to the rotational axis. Likewise, the roller main body 72B has a cylindrical shape formed around the rotational axis. Further, every straight line contained in the outer circumferential surface of the roller main body 72B is parallel to the rotational axis. Thereby, the first outer circumferential surfaces 73B and the second outer circumferential surface 73C are parallel to the rotational axis direction, and parallel to each other.

The aforementioned state to be "parallel to the rotational axis" may include a state to be slightly inclined with respect to the rotational axis. For instance, a state where the outer circumferential surface of an edge portion 76B is parallel to the rotational axis may include a state where the outer circumferential surface of the edge portion 76B is inclined with respect to the rotational axis to such a degree that an absolute value of a difference between respective radii of one end and the other end of the edge portion 76B in the left-to-right direction is equal to or less than a thickness of the conveyance belt 73.

A coefficient of friction of each edge portion 76B relative to the corresponding reinforcing band 75 is smaller than a coefficient of friction of the roller main body 72B relative to the conveyance belt 73. In the first illustrative embodiment, the edge portions 76B (i.e., the restriction members 76) may be made of resin material such as polyoxymethylene (which may hereinafter be referred to as "POM").

A length of each edge portion 76B in the left-to-right direction is larger than a length of each reinforcing band 75 in the left-to-right direction. More specifically, as shown in FIG. 4, each edge portion 76B has such a length in the left-to-right direction that even though the conveyance belt 73 moves leftward, an inner end surface 75C of the right reinforcing band 75 does not contact a right end B1 of the roller main body 72B. In other words, a below-mentioned distance D1 is longer than a below-mentioned distance D2. In FIG. 4, the distance D1 is a distance between the left end surface 73A (more generally, a one-side end surface 73A in the left-to-right direction) of the conveyance belt 73 and the inner end surface 75C of the right reinforcing band 75 (more generally, the other-side reinforcing band 75 in the left-to-right direction). The distance D2 is a distance between an inner surface A1 of the left restriction portion 76A and the right end B1 of the roller main body 72B. The aforementioned dimensional relationship on the left side among the restriction portion 76A, the edge portion 76B, the reinforcing band 75, the conveyance belt 73, and the roller main body 72B is the same as a dimensional relationship among them on the right side. This is because, as described above, the transfer unit 7 is configured in a bilaterally symmetric manner in the left-to-right direction.

In the first illustrative embodiment, there is no groove or recessed portion provided on the outer circumferential surface of each edge portion 76B. Further, on the inner circumferential surface of the conveyance belt 73, there is no protrusion provided to engage with a groove or a recessed portion provided on the outer circumferential surface of each edge portion 76B and to restrict movement of the conveyance belt 73 in the left-to-right direction.

In the first illustrative embodiment, the driving roller 71 includes a shaft 71A and a roller main body 71B rotatable integrally with the shaft 71A. The driving roller 71 does not include the restriction members 76. Further, the roller main body 71B is disposed between the left reinforcing band 75 and the right reinforcing band 75. In the left-to-right direction, the roller main body 71B is as long as the roller main body 72B of the driven roller 72. Thereby, even though the conveyance belt 73 moves along the left-to-right direction, the roller main body 71B is prevented from contacting the inner end surfaces 75C of the reinforcing bands 75.

An explanation will be provided of operations and advantageous effects of the color printer 1 configured as above. When the conveyance belt 73 rotates in the circumferential direction and moves leftward, the left end surface 73A of the conveyance belt 73 comes into contact with the inner surface A1 of the left restriction portion 76A. Thereby, the movement of the conveyance belt 73 in the left-to-right direction is restricted. In the meantime, for instance, when a specific-side (i.e., left or right) end portion of the conveyance belt 73 in the left-to-right direction contacts the specific-side restriction portion 76A, it causes a vibration of the specific-side end portion of the conveyance belt 73 in contact with the specific-side restriction portion 76A. Therefore, the specific-side end surface 73A of the conveyance belt 73 is easily damaged.

Nonetheless, in the first illustrative embodiment, the first outer circumferential surfaces 73B of the conveyance belt 73 are positioned radially outside the second outer circumferential surface 73C of the conveyance belt 73. Therefore, a tensile force applied to each end portion of the conveyance belt 73 in the left-to-right direction is higher than a tensile force applied to the middle portion of the conveyance belt 73 in the left-to-right direction. Thus, it is possible to suppress a vibration of each end portion of the conveyance belt 73 in the left-to-right direction, and to prevent the end surfaces 73A of the conveyance belt 73 from being damaged.

Further, the end portions of the conveyance belt 73 in the left-to-right direction are reinforced by the reinforcing bands 75, and are therefore thicker than the middle portion of the conveyance belt 73 in the left-to-right direction. Thereby, a load caused by a contact between an end portion of the conveyance belt 73 in the left-to-right direction and a corresponding one of the restriction portions 76A is dispersed. More specifically, for instance, a load applied when a specific-side (i.e., left or right) end portion of the conveyance belt 73 in the left-to-right direction contacts the specific-side restriction portion 76A is dispersed to the specific-side end surface 73A of the conveyance belt 73 and the outer end surface 75A of the specific-side reinforcing band 75 that are flush with each other. Thereby, it is possible to prevent the end surfaces 73A of the conveyance belt 73 from being damaged.

Further, if the first outer circumferential surfaces 73B were inclined with respect to the second outer circumferential surface 73C, a force would be easily generated to cause the end portions of the conveyance belt 73 in the left-to-right direction to move along the left-to-right direction. Nonetheless, in the first illustrative embodiment, the first outer circumferential surfaces 73B are parallel to the second outer circumferential surface 73C. Therefore, a force is less likely to be generated to cause the end portions of the conveyance belt 73 in the left-to-right direction to move along the left-to-right direction, than when the first outer circumferential surfaces 73B are inclined with respect to the second outer circumferential surface 73C.

Further, if the coefficient of friction of each edge portion 76B relative to the corresponding reinforcing band 75 were high, when the conveyance belt 73 is about to move along the left-to-right direction, the conveyance belt 73 might buckle at a portion thereof in contact with an edge portion 76B. Nonetheless, in the first illustrative embodiment, the coefficient of friction of each edge portion 76B relative to the corresponding reinforcing band 75 is smaller than the coefficient of friction of the roller main body 72B relative to the conveyance belt 73. Therefore, the end portions of the conveyance belt 73 in the rotational axis direction (i.e., the left-to-right direction) are allowed to easily move relative to the edge portions 76B in the left-to-right direction. Thus, it is possible to prevent buckling of the conveyance belt 73.

Further, when the conveyance belt 73 moves along the left-to-right direction such that a moving distance of the reinforcing bands 75 exceeds the length of the edge portions 76B in the left-to-right direction, one of the reinforcing bands 75 comes into contact with the roller main body 72B. Nonetheless, in the first illustrative embodiment, the distance D1 between the left end surface 73A of the conveyance belt 73 and the inner end surface 75C of the right reinforcing band 75 is longer than the distance D2 between the inner surface A1 of the left restriction portion 76A and the right end B1 of the roller main body 72B. Thus, even though the conveyance belt 73 moves along the left-to-right direction, it is possible to prevent the reinforcing bands 75 from contacting the roller main body 72B.

Further, on each reinforcing band 75 having the joint 75B, there is a difference in level between the joint 75B and a portion other than the joint 75B. Therefore, when the joint 75B moves along with circumferential movement of the conveyance belt 73 and reaches the corresponding edge portion 76B, a portion of the conveyance belt 73 corresponding to the joint 75B is positioned radially outside the other portion of the conveyance belt 73 that does not correspond to the joint 75B. Hence, if the respective joints 75B of the left and right reinforcing bands 75 were in different positions in the circumferential direction, different tensile forces would be applied between the left end portion and the right end portion of the conveyance belt 73 (especially when the joints 75B are carried on the edge portions 76B). Thus, in this case, the conveyance belt 73 would be easily moved along the left-to-right direction. Nonetheless, in the first illustrative embodiment, the joint 75B of the left reinforcing band 75 is positionally coincident in the circumferential direction with the joint 75B of the right reinforcing band 75. Accordingly, along with circumferential movement of the conveyance belt 73 (the reinforcing bands 75), the left joint 75B and the right joint 75B concurrently reach the left edge portion 76B and the right edge portion 76B, respectively. Thus, it is possible to prevent the conveyance belt 73 from being moved along the left-to-right direction by the joints 75B of the reinforcing bands 75.

In the first illustrative embodiment, the color printer 1 configured as above provides the following advantageous effects. The tensile force applied to each end portion of the conveyance belt 73 in the left-to-right direction is higher than the middle portion of the conveyance belt 73 in the left-to-right direction. Therefore, with a simple configuration, it is possible to suppress a vibration of each end portion of the conveyance belt 73 in the left-to-right direction, and to prevent the end surfaces 73A of the conveyance belt 73 from being damaged.

The reinforcing bands 75 are attached to the both end portions of the conveyance belt 73 in the left-to-right direction. Therefore, it is possible to further strengthen the end portions of the conveyance belt 73 in the left-to-right direction.

The coefficient of friction of each edge portion 76B relative to the corresponding reinforcing band 75 is smaller than the coefficient of friction of the roller main body 72B relative to the conveyance belt 73. Therefore, the end portions of the conveyance belt 73 in the left-to-right direction are allowed to easily move relative to the edge portions 76B in the left-to-right direction. Thus, it is possible to prevent buckling of the conveyance belt 73.

The distance D1 between the left end surface 73A of the conveyance belt 73 and the inner end surface 75C of the right reinforcing band 75 is longer than the distance D2 between the inner surface A1 of the left restriction portion 76A and the right end B1 of the roller main body 72B. Thus, even though the conveyance belt 73 moves to the left restriction portion 76A, it is possible to prevent the right reinforcing band 75 from contacting the roller main body 72B.

The sum of the radius of the edge portion 76B and the thickness of the reinforcing band 75 is larger than the radius of the roller main body 72B. Hence, even without adjusting (e.g., reducing) the thickness of the reinforcing bands 75, it is possible to provide an appropriate difference between the positions of the first outer circumferential surface 73B and the second outer circumferential surface 73C in the radial direction. Therefore, it is possible to prevent, from becoming excessively large, the difference between the positions of the first outer circumferential surface 73B and the second outer circumferential surface 73C in the radial direction. Thus, it is possible to make appropriate the tensile force applied to the conveyance belt 73.

The edge portions 76B are rotatable independently of the roller main body 76B. Therefore, it is possible to reduce an influence caused by the difference between the tensile forces applied to the middle portion and the end portions of the conveyance belt 73 in the left-to-right direction.

Each edge portion 76B is formed integrally with a corresponding one of the restriction portions 76A. Hence, there is no gap formed between each edge portion 76B and the corresponding restriction portion 76A. In addition, since it is possible to form the edge portions 76B integrally with the respective restriction portions 76A, it is possible to easily manufacture the edge portions 76B and the restriction portions 76A.

The outer end surfaces 75A of the reinforcing bands 75 in the left-to-right direction are flush with the end surfaces 73A of the conveyance belt 73 in the left-to-right direction, respectively. Therefore, it is possible to achieve large-thickness portions, of the conveyance belt 73 and the reinforcing bands 75 attached to the conveyance belt 73, to contact the restriction portions 76A. Thus, it is possible to disperse a load applied to a specific-side (i.e., left or right) end surface 73A of the conveyance belt 73 in the left-to-right direction when the specific-side end portion of the conveyance belt 73 comes into contact with the specific-side restriction portion 76A.

Second Illustrative Embodiment

Subsequently, an explanation will be provided of a second illustrative embodiment according to aspects of the present disclosure. In the following description for the second illustrative embodiment, the same elements as exemplified in the aforementioned first illustrative embodiment will be provided with the same reference characters, and explanations of the same elements will be omitted.

Figure 5:
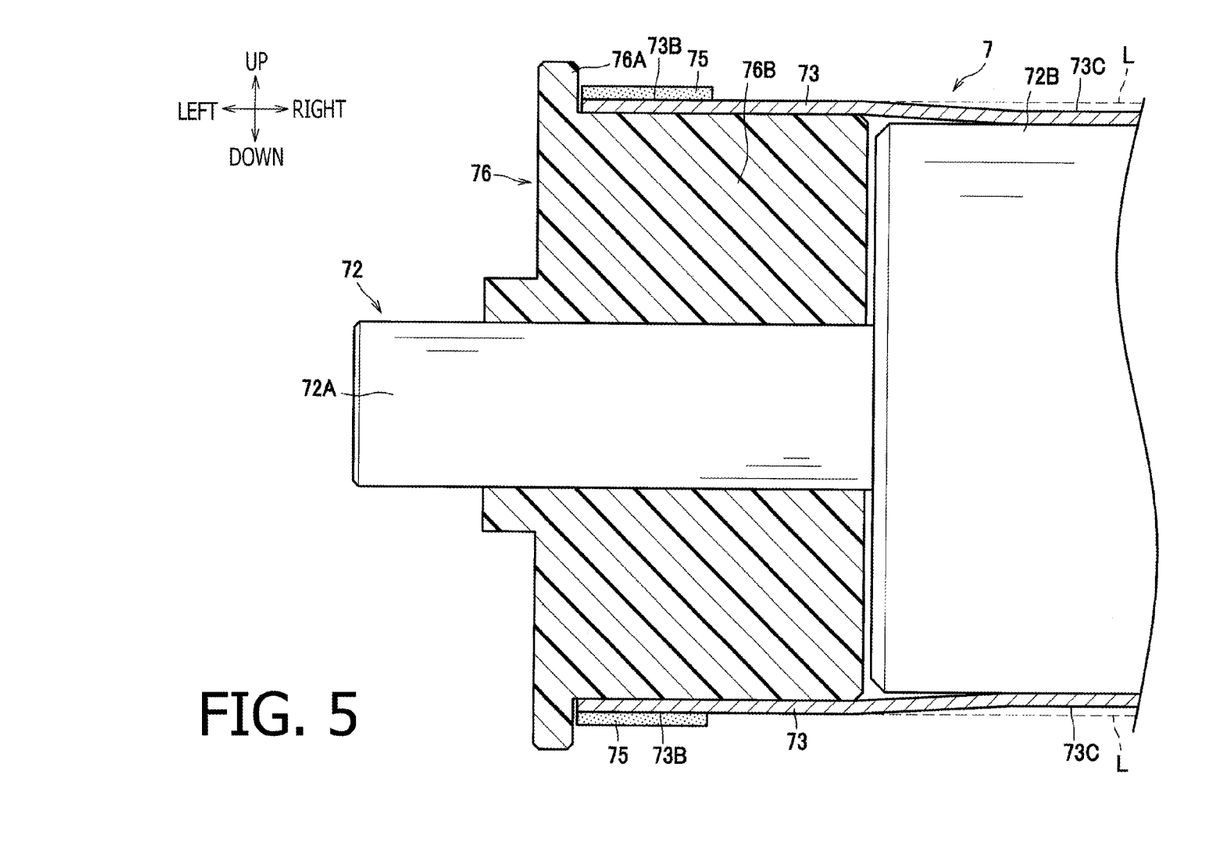
FIG. 5 is a cross-sectional front view corresponding to FIG. 3, schematically showing a left end portion of a transfer unit in a second illustrative embodiment according to one or more aspects of the present disclosure.

As shown in FIG. 5, in the second illustrative embodiment, an edge portion 76B of each restriction portion 76 has a diameter larger than the diameter of the roller main body 72B. Each edge portion 76B is in contact with the inner circumferential surface of the conveyance belt 73. Thereby, an extension line L extending from each first outer circumferential surface 73B is positioned radially outside the second outer circumferential surface 73C. Further, the first outer circumferential surfaces 73B and the second outer circumferential surface 73C are parallel to the rotational axis direction, and parallel to each other.

A coefficient of friction of each edge portion 76B relative to the conveyance belt 73 is smaller than a coefficient of friction of the roller main body 72B relative to the conveyance belt 73. In addition, a reinforcing band 75 is attached onto the outer circumferential surface of each end portion of the conveyance belt 73 in the rotational axis direction (i.e., the left-to-right direction).

In the second illustrative embodiment as well, in the same manner as the aforementioned first illustrative embodiment, it is possible to suppress a vibration of each end portion of the conveyance belt 73 in the rotational axis direction, with a simple configuration. Thereby, it is possible to prevent the end surfaces 73A of the conveyance belt 73 from being damaged.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

In the aforementioned first illustrative embodiment, the diameter of each edge portion 76B is smaller than the diameter of the roller main body 72B. Nonetheless, the diameter of each edge portion 76B may be the same as the diameter of the roller main body 72B.

In the aforementioned first illustrative embodiment, the coefficient of friction of each edge portion 76B relative to the corresponding reinforcing band 75 is smaller than the coefficient of friction of the roller main body 72B relative to the conveyance belt 73. Nonetheless, the coefficient of friction of each edge portion 76B relative to the corresponding reinforcing band 75 may be equal to the coefficient of friction of the roller main body 72B relative to the conveyance belt 73.

In the aforementioned second illustrative embodiment, the coefficient of friction of each edge portion 76B relative to the conveyance belt 73 is smaller than the coefficient of friction of the roller main body 72B relative to the conveyance belt 73. Nonetheless, the coefficient of friction of each edge portion 76B relative to the conveyance belt 73 may be equal to the coefficient of friction of the roller main body 72B relative to the conveyance belt 73.

In the aforementioned illustrative embodiments, each edge portion 76B is rotatable independently of the roller main body 72B. Nonetheless, each edge portion 76B may be rotatable integrally with the roller main body 72B.

In the aforementioned illustrative embodiments, each edge portion 76B is formed integrally with the corresponding restriction portion 76A. Nonetheless, each edge portion 76B may be formed separately from the corresponding restriction portion 76A.

In the aforementioned illustrative embodiments, the outer end surfaces 75A of the reinforcing bands 75 in the left-to-right direction are flush with the end surfaces 73A of the conveyance belt 73 in the left-to-right direction, respectively. Nonetheless, the outer end surfaces 75A of the reinforcing bands 75 in the left-to-right direction may not be flush with the end surfaces 73A of the conveyance belt 73 in the left-to-right direction.

In the aforementioned illustrative embodiments, the conveyance belt 73 is exemplified as a belt according to aspects of the present disclosure. Nonetheless, for instance, an intermediate transfer belt or a photoconductive body belt of an image forming apparatus may be exemplified as the belt according to aspects of the present disclosure. Namely, the belt according to aspects of the present disclosure is not limited to a belt conveying a sheet with a toner image formed thereon, but may be a belt configured such that a toner image is formed thereon.

In the aforementioned illustrative embodiments, aspects of the present disclosure are applied to the color printer 1. Nonetheless, aspects of the present disclosure may be applied to other image forming apparatuses such as copy machines and multi-function peripherals.

What is claimed is:

1. An image forming apparatus comprising:
a plurality of rollers comprising a specific roller;
a belt wound around the plurality of rollers, the belt having an end portion at both ends of the belt, each end portion including an end surface facing outward in a rotational axis direction of the specific roller;
a plurality of reinforcing bands, each reinforcing band having two end surfaces and being attached onto a circumferential surface of a corresponding one of the end portions of the belt, which extends in the rotational axis direction, each reinforcing band having a corresponding one of the two end surfaces facing outward in the rotational axis direction, and each reinforcing band being of the same size or made of the same material; and
a plurality of restriction portions disposed outside the belt in the rotational axis direction of the specific roller, each restriction portion being configured to restrict movement of the belt in the rotational axis direction by contacting a corresponding one of the end surfaces of the belt and the end surface of a corresponding reinforcing band in the rotational axis direction,
wherein the belt has:
a first outer circumferential surface of the end portion of the belt extending in the rotational axis direction, the end portion including the end surface of the belt contactable with a corresponding restriction portion; and
a second outer circumferential surface of a middle portion of the belt in the rotational axis direction, the first outer circumferential surface being positioned outside the second outer circumferential surface in a radial direction of the specific roller, the first outer circumferential surface being parallel to the second outer circumferential surface,
wherein the plurality of restriction portions includes a left restriction portion and a right restriction portion disposed outside a roller main body of the specific roller in the rotational axis direction on a left side and a right side, respectively,
wherein the plurality of reinforcing bands includes a left reinforcing band and a right reinforcing band disposed at left and right end portions of the belt in the rotational axis direction, respectively,
wherein a first distance is longer than a second distance, the first distance being a distance between a left side end surface of the belt in the rotational axis direction and an inner end surface of the right reinforcing band in the rotational axis direction, the second distance being a distance between an inner surface of the left restriction portion in the rotational axis direction and a rightmost end of the roller main body in the rotational axis direction, the right side being opposite to the left side in the rotational axis direction, and
wherein both the right reinforcing band and a rightmost end of the belt are entirely positioned between the rightmost end of the roller main body and an inner surface of the right restriction portion in the rotational axis direction.

2. The image forming apparatus according to claim 1, further comprising a plurality of edge portions each of which being disposed between the roller main body of the specific roller and a corresponding restriction portion in the rotational axis direction, wherein each edge portion is configured to contact an inner circumferential surface of a corresponding reinforcing band, a coefficient of friction of the edge portion relative to the corresponding reinforcing band being smaller than a coefficient of friction of the roller main body relative to the belt.

3. The image forming apparatus according to claim 2, wherein a length of each edge portion in the rotational axis direction is larger than a length of the corresponding reinforcing band in the rotational axis direction.

4. The image forming apparatus according to claim 3, wherein the plurality of edge portions includes a left edge portion and a right edge portion disposed outside the roller main body of the specific roller in the rotational axis direction on the left side and the right side, respectively, each of the left and right edge portions being positioned between the roller main body of the specific roller and a corresponding one of the left and right restriction portions in the rotational axis direction.

5. The image forming apparatus according to claim 2, wherein each edge portion has a diameter smaller than a diameter of the roller main body.

6. The image forming apparatus according to claim 1, further comprising a plurality of edge portions each of the edge portions being disposed between the roller main body of the specific roller and a corresponding restriction portion in the rotational axis direction, each edge portion having a diameter larger than a diameter of the roller main body.

7. The image forming apparatus according to claim 6, wherein each reinforcing band is attached onto an outer circumferential surface of a corresponding end portion of the belt in the rotational axis direction.

8. The image forming apparatus according to claim 6, wherein a coefficient of friction of each edge portion relative to the belt is smaller than a coefficient of friction of the roller main body relative to the belt.

9. The image forming apparatus according to claim 2, wherein each edge portion is rotatable independently of the roller main body.

10. The image forming apparatus according to claim 2, wherein each edge portion is formed integrally with a corresponding restriction portion.

11. The image forming apparatus according to claim 1, wherein the end surface of the belt in the rotational axis direction is positionally coincident in the rotational axis direction with an end surface of each reinforcing band in the rotational axis direction, the end surface of each reinforcing band being opposed to the restriction portion.

12. The image forming apparatus according to claim 6, wherein each edge portion is rotatable independently of the roller main body.

13. The image forming apparatus according to claim 6, wherein each edge portion is formed integrally with a corresponding restriction portion.

14. The image forming apparatus according to claim 7, wherein each end surface of the belt in the rotational axis direction is positionally coincident in the rotational axis direction with an end surface of the corresponding reinforcing band in the rotational axis direction, the end surface of the corresponding reinforcing band being opposed to the corresponding restriction portion.

15. The image forming apparatus according to claim 1, wherein the belt includes nylon.

16. The image forming apparatus according to claim 1, wherein each restriction portion includes polyoxymethylene.

17. The image forming apparatus according to claim 1, wherein each reinforcing band includes polyethylene-terephthalate.

18. The image forming apparatus according to claim 1,
wherein the belt includes nylon,
wherein each reinforcing band includes polyethylene-terephthalate, and
wherein each restriction portion includes polyoxymethylene.

19. An image forming apparatus comprising:
a plurality of rollers comprising a specific roller;
a belt wound around the plurality of rollers, the belt having an end portion at both ends of the belt, each end portion including an end surface facing outward in a rotational axis direction of the specific roller;
a plurality of reinforcing bands, each of the reinforcing bands having two end surfaces and being attached onto a circumferential surface of a corresponding one of the end portions of the belt, which extends in the rotational axis direction, each reinforcing band having a corresponding one of the two end surfaces facing outward in the rotational axis direction; and
a plurality of restriction portions disposed outside the belt in the rotational axis direction of the specific roller, each restriction portion being configured to restrict movement of the belt in the rotational axis direction by contacting a corresponding one of the end surfaces of the belt and the end surface of a corresponding reinforcing band in the rotational axis direction; and
a plurality of edge portions, each of the edge portions being disposed between a roller main body of the specific roller and a corresponding restriction portion in the rotational axis direction,
wherein the belt has:
a first outer circumferential surface of the end portion of the belt extending in the rotational axis direction, the end portion including the end surface of the belt contactable with the restriction portion; and
a second outer circumferential surface of a middle portion of the belt in the rotational axis direction, the first outer circumferential surface being positioned outside the second outer circumferential surface in a radial direction of the specific roller, the first outer circumferential surface being parallel to the second outer circumferential surface,
wherein the plurality of restriction portions include a left restriction portion and a right restriction portion disposed outside the roller main body of the specific roller in the rotational axis direction on a left side and a right side, respectively,
wherein the plurality of reinforcing bands includes a left reinforcing band and a right reinforcing band disposed at left and right end portions of the belt in the rotational axis direction, respectively,
wherein a first distance is longer than a second distance, the first distance being a distance between a left side end surface of the belt in the rotational axis direction and an inner end surface of the right reinforcing band in the rotational axis direction, the second distance being a distance between an inner surface of the left restriction portion in the rotational axis direction and a rightmost end of the roller main body in the rotational axis direction, the right side being opposite to the left side in the rotational axis direction, wherein the plurality of edge portions includes a left edge portion and a right edge portion disposed outside the roller main body of the specific roller in the rotational axis direction on the left side and the right side, respectively, wherein the right reinforcing band, the rightmost end of the belt, and the right edge portion, which is in contact with an inner circumferential surface of the right reinforcing band, are entirely positioned between the rightmost end of the roller main body and an inner surface of the right restriction portion in the rotational axis direction, and wherein both the left reinforcing band and the left edge portion, which is in contact with an inner circumferential surface of the left reinforcing band, are entirely positioned between a leftmost end of the roller main body and an inner surface of the left restriction portion in the rotational axis direction.

\* \* \* \* \*